(12) United States Patent
Seita

(10) Patent No.: US 7,256,952 B2
(45) Date of Patent: Aug. 14, 2007

(54) FIXATION METHOD FOR OPTICAL MEMBER AND OPTICAL UNIT

(75) Inventor: Masato Seita, Saitama (JP)

(73) Assignee: Canon Kabushiki Kaisha, Tokyo (JP)

(\*) Notice: Subject to any disclaimer, the term of this patent is extended or adjusted under 35 U.S.C. 154(b) by 92 days.

(21) Appl. No.: 11/139,293

(22) Filed: May 27, 2005

(65) Prior Publication Data

US 2005/0270668 A1    Dec. 8, 2005

(30) Foreign Application Priority Data

Jun. 2, 2004    (JP)    .............................. 2004-163921

(51) Int. Cl.
  *G02B 7/02*    (2006.01)
(52) U.S. Cl. ...................... 359/819; 359/811; 359/820; 219/121.63; 219/121.64
(58) Field of Classification Search ................ 359/811, 359/819, 820; 219/121.63, 121.64
See application file for complete search history.

(56) References Cited

U.S. PATENT DOCUMENTS 6,195,214 B1 \* 2/2001 Muray et al. ............... 359/819

2006/0049154 A1 \* 3/2006 Clifford et al. .......... 219/121.64

FOREIGN PATENT DOCUMENTS

| CN | 1333473 | | 1/2002 |
|---|---|---|---|
| CN | 1407362 | | 4/2003 |
| CN | 1450377 | | 4/2003 |
| JP | 2003-66301 | | 3/2003 |
| JP | 2003-123506 | \* | 4/2003 |
| JP | 2003-287665 | | 10/2003 |
| JP | 2004-20867 | A | 1/2004 |
| JP | 2004-145057 | | 11/2006 |

\* cited by examiner

*Primary Examiner*—Hung Dang
*Assistant Examiner*—Joseph Martinez
(74) *Attorney, Agent, or Firm*—Canon U.S.A. Inc. I.P. Div

(57) ABSTRACT

A fixation method for fixing an optical member to a holding member using irradiation of a laser beam. The method includes the steps of inserting the optical member into the holding member, providing a fixing member, mounting the fixing member to the holding member having the optical member positioned therebetween, and irradiating laser beams on the holding member through the fixing member.

8 Claims, 4 Drawing Sheets

FIXATION METHOD FOR OPTICAL MEMBER AND OPTICAL UNIT

BACKGROUND OF THE INVENTION

1. Field of the Invention

The present invention relates to a fixation method for an optical member, such as a photographic lens, in which the optical member is joined and fixed to a holding member using laser welding, and also relates to an optical unit having such an optical member fixed.

2. Description of the Related Art

In conventional optical apparatuses, such as still cameras or video cameras, a variety of methods for fixing a lens have been employed. In recent years, since the size of a still camera or video camera has become smaller and a space usable for fixing a lens has also become smaller, a method for fixing a lens using adhesives is generally employed. Moreover, a method for fixing a lens using so-called thermal caulking in which a part of a lens holder is thermally deformed is also known.

However, in the case of the method for fixing a lens to a lens holder or the like using adhesives, which is generally employed, the adhesive may intrude into the effective diameter of the lens or may protrude from the lens holder, thus causing difficulty in production control. In addition, contraction of the adhesive being cured may distort the lens. Furthermore, the amount of applied adhesive may vary with the applied positions, thereby causing distortion of the lens, so that a desired optical performance may not be obtained. Furthermore, while an ultraviolet curable resin can be taken as an example of an adhesive usable for bonding an optical element, such as a lens, the time of irradiation of ultraviolet rays required to cure the ultraviolet curable resin is several seconds to several tens of seconds. It takes further time to completely cure the adhesive. Therefore, even if the position of a lens is adjusted, for example, by the correction for decentering, the lens position may gradually vary due to the unevenness of contraction of the adhesive until the adhesive is completely cured. Accordingly, the lens position may deviate from a desired position. Furthermore, in the case of a plastic lens, the lens may become yellowed by the intense irradiation of ultraviolet rays. Therefore, the color balance of the lens may vary.

In the fixation method using the thermal caulking, heat is also conducted to portions other than that required to be heated. Therefore, a portion of the lens holder other than a portion required to be heated may be deformed. If the lens or the lens holder is reduced in size and portions for mounting other parts are close to each other, the influence of heat further increases. If heat is excessively conducted to the lens, the lens may be deformed.

As a method for solving the problems with the bonding by the ultraviolet curable resin or with the thermal caulking for fixing a lens, Japanese Laid-Open Patent Application No. 2004-20867 discloses a technique of fixing a lens to a part, such as a lens holder, using laser welding. In this technique, a laser beam is radiated to a lens holder, a viewfinder holder or the like, which is made of plastic, so as to fix a plastic lens thereto.

SUMMARY OF THE INVENTION

The present invention is directed to a method for fixing an optical member to a holding member and to an optical unit. In one aspect of the present invention, a fixation method for fixing an optical member to a holding member includes the steps of inserting the optical member into the holding member, providing a fixing member, mounting the fixing member to the holding member having the optical member positioned therebetween, and irradiating laser beams on the holding member through the fixing member. In another aspect of the present invention, an optical unit includes an optical member having an outer circumference portion; a holding member configured to hold the optical member, the holding member including a wall portion configured to face the outer circumference portion of the optical member and having an end face, the holding member being made of a laser beam absorbent plastic; and a fixing member configured to contact with the outer circumference portion of the optical member and to contact with the end face of the wall portion of the holding member, the fixing member being made of a laser beam transparent plastic, the fixing member being fixed to the holding member by a part of the holding member being melted by a laser beam impinging on the part of the holding member through the fixing member.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

First Embodiment

Figure 1:
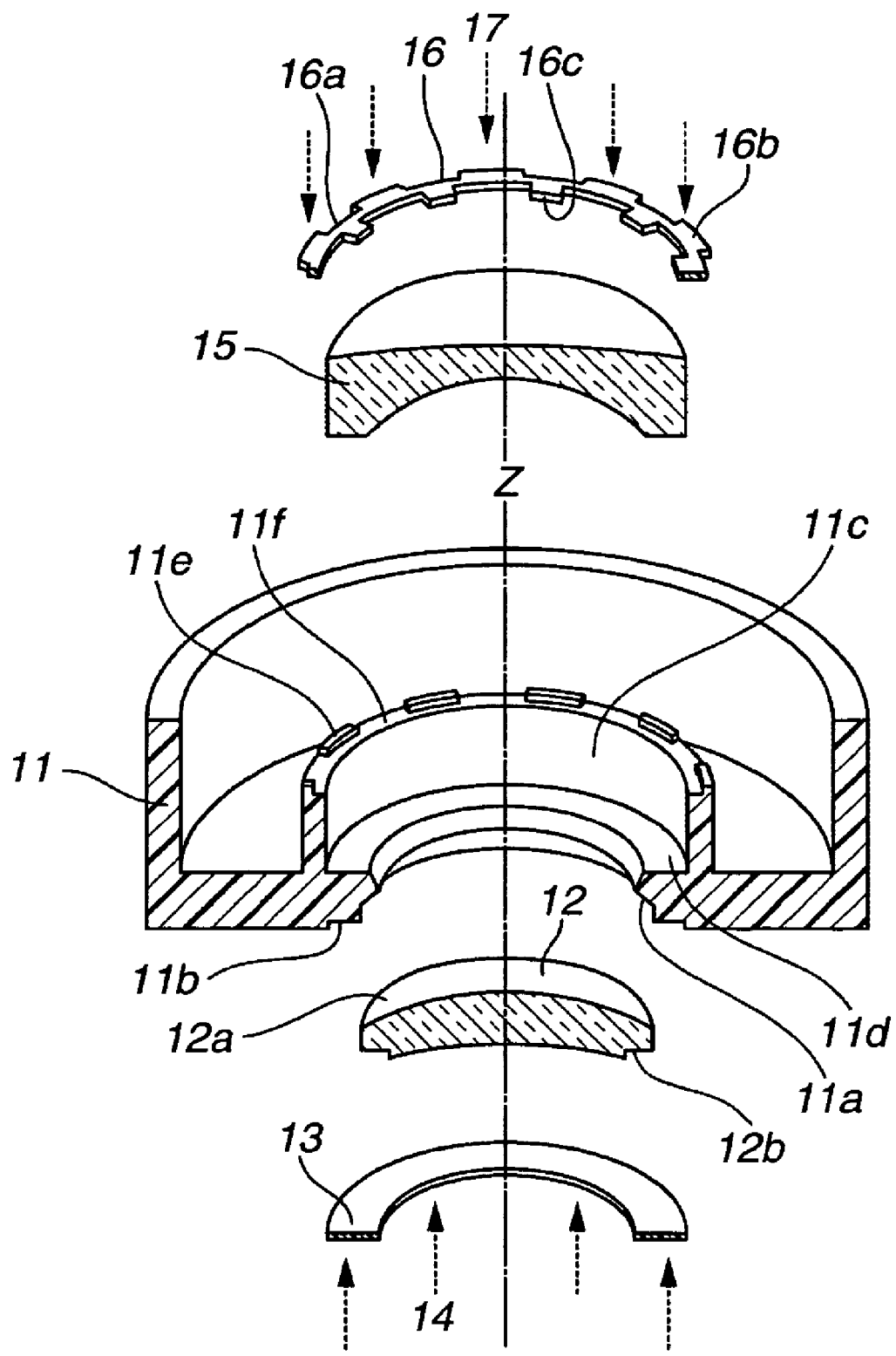
FIG. 1 is a perspective sectional view showing a lens unit according to a first embodiment of the invention in a condition before assembling the lens unit.
Figure 2:
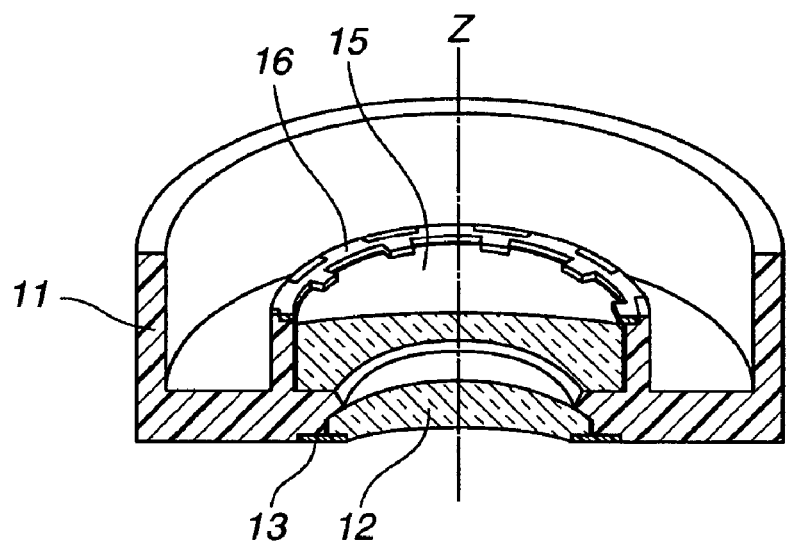
FIG. 2 is a perspective sectional view showing the lens unit according to the first embodiment in a condition after completing assembling the lens unit.

FIG. 1 is a perspective sectional view showing a lens unit according to a first embodiment of the invention in a condition before assembling the lens unit. FIG. 2 is a perspective sectional view showing the lens unit in a condition after completing assembling the lens unit. The sequence for assembling the lens unit according to the first embodiment is described below with reference to FIGS. 1 and 2.

First, a first lens 12 made of glass or plastic and a lens holder 11 made of a laser beam absorbent plastic are aligned with respect to their optical axes Z by using a given method. The first lens 12 is then fitted into the lens holder 11 from below in FIG. 1 in such a manner that an outer circumference portion 12a of the first lens 12 abuts on a lens-contacting portion 11a of an inner circumference portion of the lens holder 11. Subsequently, a first lens presser frame 13 made of a laser beam transparent plastic is fitted into the lens holder 11 from below the first lens 12. More specifically, the lens holder 11 includes, in addition to the lens-contacting portion 11a, a frame-abutting portion 11b serving to position an outer circumference portion of the first lens presser frame 13. The first lens 12 includes a frame-abutting portion 12b serving to position an inner circumference portion of the first lens presser frame 13. The first lens presser frame 13 is fitted to both frame-abutting portions 11b and 12b. Accordingly, the lens holder 11, the first lens 12 and the first lens presser frame 13 are substantially aligned with respect to their optical axes Z.

Next, laser beams 14 are simultaneously radiated onto a plurality of sections of the first lens presser frame 13 from below in FIG. 1. More particularly, the laser beams 14 are applied only to a plurality of sections of the outer circumference portion of the first lens presser frame 13 that correspond in position to the frame-abutting portion 11b of the lens holder 11. Since the first lens presser frame 13 is formed of a laser beam transparent plastic, the laser beams 14 pass through the first lens presser frame 13 and are then absorbed by the frame-abutting portion 11b of the lens holder 11, which is formed of a laser beam absorbent plastic. Then, at the frame-abutting portion 11b, the laser beams 14 are converted into heat to melt some portions of the lens holder 11. This heat also melts some portions of the first lens presser frame 13. In this instance, the laser beams 14 do not impinge on the first lens 12, and the first lens 12 is positioned somewhat away from the welding zones. Accordingly, the first lens 12 is not affected by the heat. After that, when the laser radiation is stopped, the melted plastics are quickly cooled, and the first lens presser frame 13 and the lens holder 11 are welded and bonded together, as shown in FIG. 2.

The inner diameter portion of the first lens presser frame 13, which is in contact with the frame-abutting portion 12b, functions as an optical aperture limiter for eliminating undesired light beams coming from an aperture portion. While, in FIG. 1, the first lens presser frame 13 provides a circular aperture, it may be configured to provide a quadrilateral aperture.

Subsequently, a second lens 15 made of glass or plastic is aligned with the lens holder 11 with respect to their optical axes Z by using a given method. The second lens 15 is then fitted to a wall 11c and a lens-contacting portion 11d which are formed in the lens holder 11. Then, a second lens presser frame 16 made of a laser beam transparent plastic is fitted into the lens holder 11 from above the second lens 15. More specifically, the lens holder 11 further includes presser-frame guides 11e configured to engage with recess portions 16a of the second lens presser frame 16 so as to position the second lens presser frame 16. By causing the recess portions 16a to engage with the presser-frame guides 11e, the second lens presser frame 16 is positioned with respect to the lens holder 11. Accordingly, laser welding portions 11f of the lens holder 11 are kept in close contact with laser receiving portions 16b of the second lens presser frame 16. In this instance, a plurality of lens presser portions 16c formed on the inner circumference portion of the second lens presser frame 16 keep the second lens 15 pressed against the lens holder 11.

Next, laser beams 17 are simultaneously radiated onto a plurality of sections (laser receiving portions 16b) of the outer circumference portion of the second lens presser frame 16 from above in FIG. 1. Since the second lens presser frame 16 is formed of a laser beam transparent plastic, the laser beams 17 pass through the second lens presser frame 16 and are then absorbed by the lens holder 11, which is formed of a laser beam absorbent plastic. Then, at the lens holder 11, the laser beams 17 are converted into heat to melt the laser welding portions 11f of the lens holder 11. This heat also melts some portions of the second lens presser frame 16. In this instance, the laser beams 17 do not impinge on the second lens 15, and the second lens 15 is positioned somewhat away from the welding zones. Accordingly, the second lens 15 is not affected by the heat. After that, when the laser radiation is stopped, the melted plastics are quickly cooled, and the second lens presser frame 16 and the lens holder 11 are welded and bonded together, as shown in FIG. 2.

In the first embodiment, the first lens 12 is first fixed using laser welding and, then, the second lens 15 is fixed using laser welding. However, the present invention is not limited to this order. For example, the first lens 12 and the second lens 15 may be approximately simultaneously fixed by approximately simultaneously radiating laser beams from both sides. Furthermore, only one of the first lens 12 and the second lens 15 may be fixed using laser welding or may be installed in the lens holder 11.

According to the above-described first embodiment, welding by laser beams is utilized to fix the first lens 12 between the lens holder 11 and the first lens presser frame 13 and to fix the second lens 15 between the lens holder 11 and the second lens presser frame 16 without using adhesives. Therefore, high-speed and high-precision fixation is possible, and a constant intensity of fixation can be attained.

Furthermore, since laser beams do not impinge directly on the first lens 12 and the second lens 15, the first lens 12 and the second lens 15 are prevented from being subjected to thermal deformation. Also, the first lens 12 and the second lens 15 can be made of glass without the lens material being limited to laser beam absorbent plastics as in the conventional method. Moreover, since the laser beams 14 or 17 are approximately simultaneously radiated onto a plurality of sections to fix the lens 12 or 15, the position of the lens 12 or 15 is prevented from changing after laser welding as in the conventional method. Accordingly, the positional accuracy of the lens 12 or 15 can be maintained. Furthermore, the inner diameter portion of the first lens presser frame 13 can be configured to serve as an optical aperture limiter for eliminating undesired light beans coming from an aperture portion.

Second Embodiment

Figure 3:
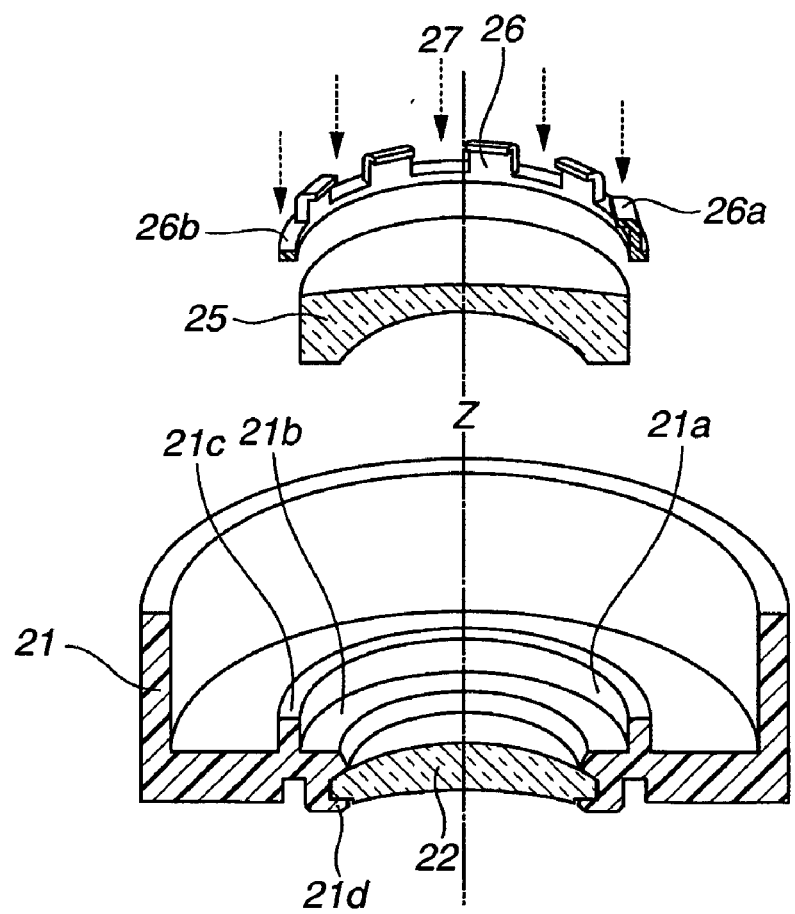
FIG. 3 is a perspective sectional view showing a lens unit according to a second embodiment of the invention in a condition before assembling the lens unit.
Figure 4:
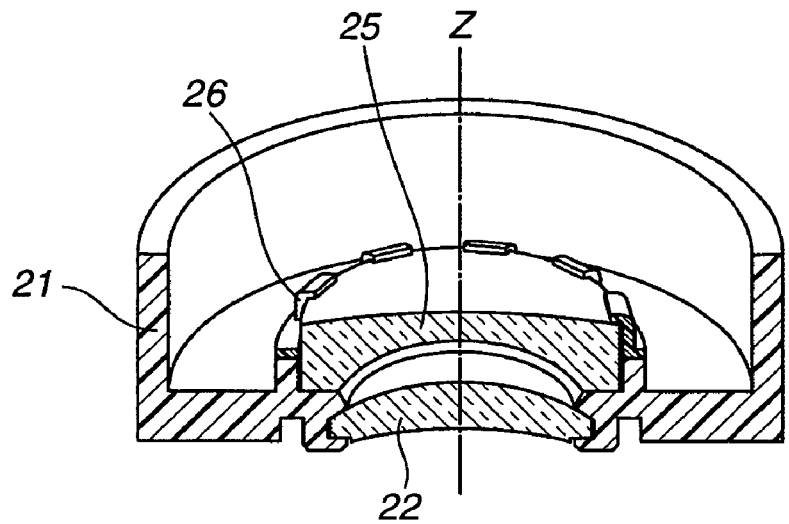
FIG. 4 is a perspective sectional view showing the lens unit according to the second embodiment in a condition after completing assembling the lens unit.

FIG. 3 is a perspective sectional view showing a lens unit according to a second embodiment of the present invention in a condition before assembling the lens unit. FIG. 4 is a perspective sectional view showing the lens unit in a condition after completing assembly of the lens unit. The sequence for assembling the lens unit according to the second embodiment is described below with reference to FIGS. 3 and 4.

First, a first lens 22 is fitted into a lens holder 21 from below in FIG. 3 by using a given method. Accordingly, the first lens 22 is fixed to a first lens fixing portion 21d of the lens holder 21.

Next, a second lens 25 made of glass or plastic is fitted to a wall portion 21a and a lens-contacting portion 21b of the lens holder 21 from above the lens holder 21. In this case, the diameter of the second lens 25 is configured to be slightly smaller than the diameter of a lens housing portion constituted by the wall portion 21a and the lens-contacting portion 21b of the lens holder 21. Therefore, the second lens 25 is fitted in the lens holder 21 with a slight clearance kept therebetween in a direction perpendicular to the optical axis Z. Next, a second lens presser frame 26 made of a laser beam transparent plastic is mounted on the second lens 25 from above the second lens 25. Then, by moving the second lens presser frame 26 mounted on the second lens 25 in a direction perpendicular to the optical axis Z by using a given method, the optical axis Z of the second lens 25 is aligned with the optical axis Z of the first lens 22. The second lens presser frame 26 includes lens presser portions 26a that are elastically deformable. After the second lens 25 and the first lens 22 are aligned with respect to their optical axes Z in the above-described manner, laser welding portions 21c of the lens holder 21 and laser receiving portions 26b of the second lens presser frame 26 are kept in close contact with each other by a clamping device (not shown).

Subsequently, laser beams 27 are simultaneously radiated from above in FIG. 3 onto the laser receiving portions 26b, which are formed at a plurality of sections on the outer circumference portion of the second lens presser frame 26. Since the second lens presser frame 26 is formed of a laser beam transparent plastic, the laser beams 27 pass through the second lens presser frame 26 and are then absorbed by the lens holder 21, which is formed of a laser beam absorbent plastic. Then, at the lens holder 21, the laser beams 27 are converted into heat to melt the laser welding portions 21c of the lens holder 21. This heat also melts some portions of the second lens presser frame 26. In this instance, the laser beams 27 do not impinge on the second lens 25, and the second lens 25 is somewhat positioned away from the welding zones. Accordingly, the second lens 25 is not affected by the heat. After that, when the laser radiation is stopped, the melted plastics are quickly cooled, and the second lens presser frame 26 and the lens holder 21 are welded and bonded together, as shown in FIG. 4.

Then, the lens holder 21 and the second lens presser frame 26 are released from close contact by the clamping device (not shown). In this respect, since the lens presser portions 26a of the second lens presser frame 26 have elastic force serving to constantly press the second lens 25 against the lens-contacting portion 21b of the lens holder 21, the second lens 25 is highly precisely positioned without becoming unstable with respect to the lens holder 21. In addition, even if a large impact is accidentally applied to the second lens 25, the lens presser portions 26a absorb the impact by being elastically deformed, so that the second lens 25 can be prevented from cracking.

The above-described second embodiment has the following advantages in addition to the advantages of the first embodiment. The position of the second lens 25 can be shifted in order to perform positioning adjustment prior to the laser radiation. Even if the position of the second lens 25 is somewhat shifted, a condition of the welding zones does not change, and it is not necessary to change the position or setting of a laser apparatus. Therefore, the second lens 25 can be fixed between the second lens presser frame 26 and the lens holder 21 with a constant fixation strength. In addition, since elastically-deformable portions having weak elasticity (lens presser portions 26a) are provided at a plurality of sections of the second lens presser frame 26, the second lens 25 can be prevented from becoming unstable when being fixed to the lens holder 21. Furthermore, if an impact is accidentally applied to the second lens 25, the elastically-deformable portions absorb the impact by being elastically deformed, so that the second lens 25 can be prevented from cracking.

Third Embodiment

Figure 5:
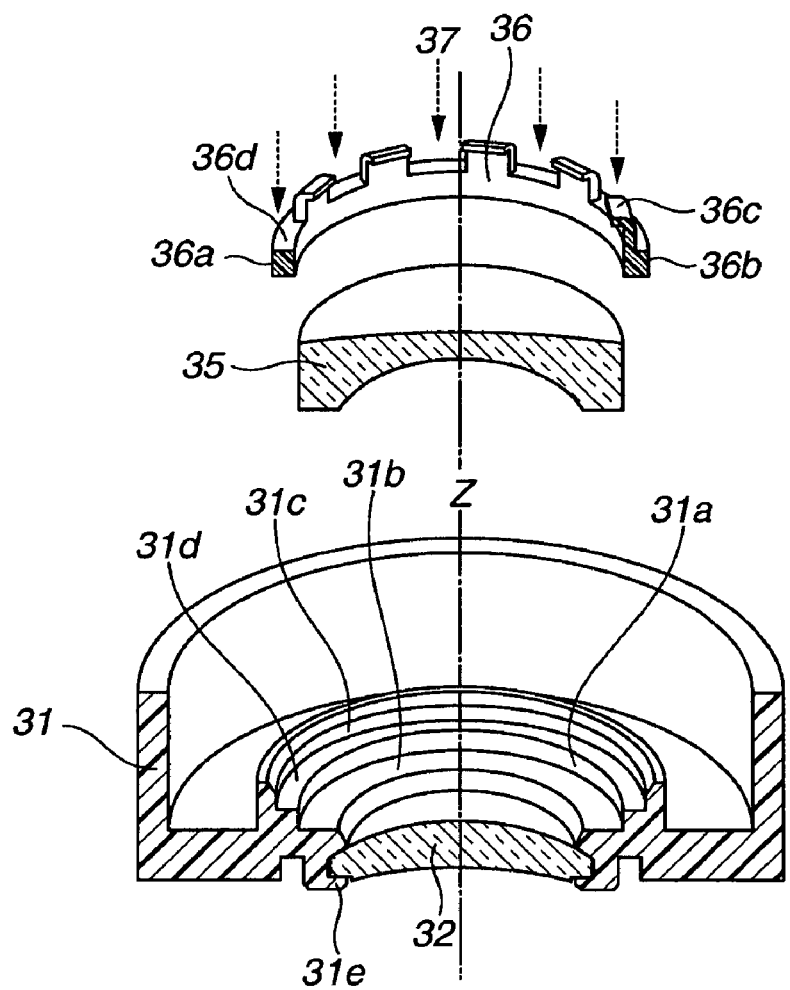
FIG. 5 is a perspective sectional view showing a lens unit according to a third embodiment of the invention in a condition before assembling the lens unit.
Figure 6:
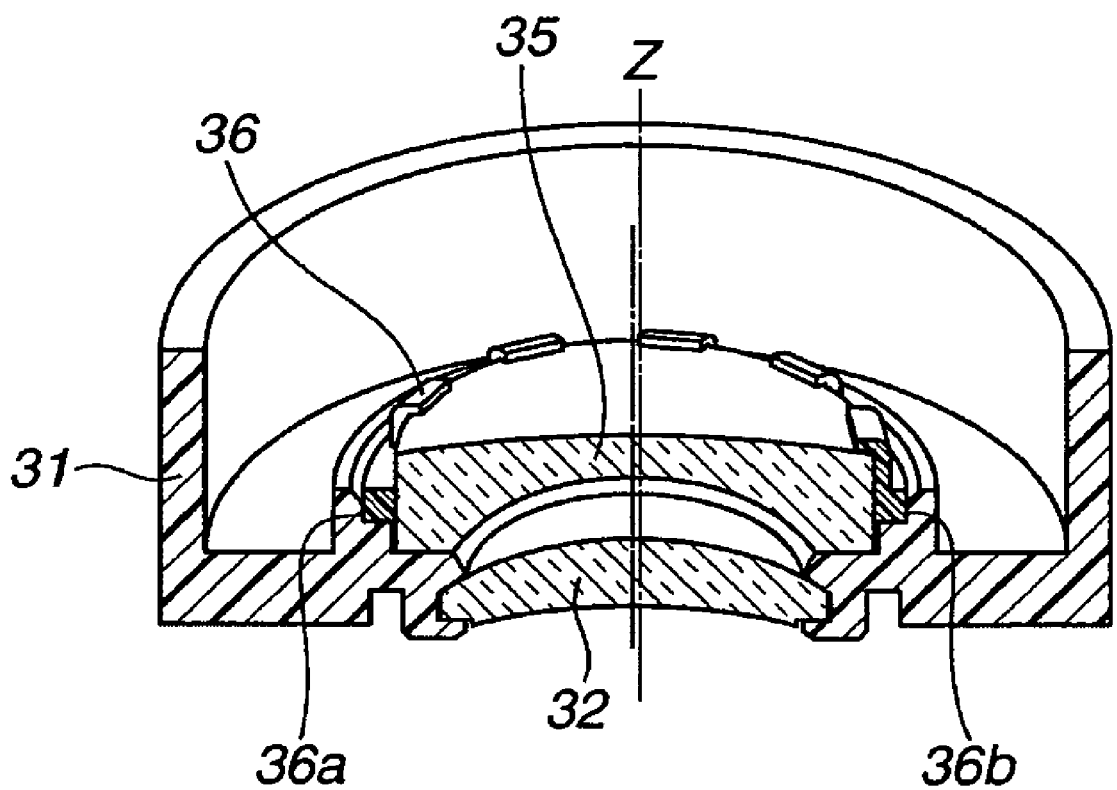
FIG. 6 is a perspective sectional view showing the lens unit according to the third embodiment in a condition after completing assembling the lens unit.

FIG. 5 is a perspective sectional view showing a lens unit according to a third embodiment of the invention in a condition before assembling the lens unit. FIG. 6 is a perspective sectional view showing the lens unit in a condition after completing assembling the lens unit. The sequence for assembling the lens unit according to the third embodiment is described below with reference to FIGS. 5 and 6.

First, a first lens 32 is fitted into a lens holder 31 from below in FIG. 5 by using a given method. Accordingly, the first lens 32 is fixed to a first lens fixing portion 31e of the lens holder 31.

Next, a second lens 35 made of glass or plastic is fitted to a wall portion 31a and a lens-contacting portion 31b of the lens holder 31 from above the lens holder 31. Then, a second lens presser frame 36 made of a laser beam transparent plastic is mounted on the second lens 35 from above the second lens 35. In this instance, the second lens 35 is approximately coaxially fitted in an inner diameter portion of the second lens presser frame 36. In addition, the second lens presser frame 36 is configured such that the center of its outer circumference portion slightly deviates from the center of its inner circumference portion, that is, the thickness in the radial direction slightly differs between outer circumference portions 36a and 36b of the second lens presser frame 36. The second lens presser frame 36 configured as described above is fitted to a wall portion 31c of the lens holder 31. In general, it is difficult to exactly adjust the first lens 32, which is already fixed to the lens holder 31, to the optical axis Z, and it is considered that the first lens 31 is fixed while slightly deviating from the optical axis Z. Therefore, the optical axis Z of the second lens 35 is adjusted to a desired position, i.e., to the optical axis Z of the first lens 32, by rotating the second lens presser frame 36 along the wall portion 31c of the lens holder 31. The second lens presser frame 36 includes lens presser portions 36c that are elastically deformable.

After the optical axis Z of the second lens 35 is aligned with the optical axis Z of the first lens 32 as described above, laser welding portions 31d of the lens holder 31 and laser receiving portions 36d of the second lens presser frame 36 are kept in close contact with each other by a clamping device (not shown).

Subsequently, laser beams 37 are simultaneously radiated from above in FIG. 5 onto the laser receiving portions 36d, which are formed at a plurality of sections on the outer circumference portion of the second lens presser frame 36. Since the second lens presser frame 36 is formed of a laser beam transparent plastic, the laser beams 37 pass through the second lens presser frame 36 and are then absorbed by the lens holder 31, which is formed of a laser beam absorbent plastic. Then, at the lens holder 31, the laser beams 37 are converted into heat to melt the laser welding portions 31d of the lens holder 31. This heat also melts some portions of the second lens presser frame 36. In this instance, the laser beams 37 do not impinge on the second lens 35, and the second lens 35 is positioned somewhat away from the welding zones. Accordingly, the second lens 35 is not affected by the heat. After that, when the laser radiation is stopped, the melted plastics are quickly cooled, and the second lens presser frame 36 and the lens holder 31 are welded and bonded together, as shown in FIG. 6.

Then, the lens holder 31 and the second lens presser frame 36 are released from close contact by the clamping device (not shown). In this respect, since the lens presser portions 36c of the second lens presser frame 36 have elastic force serving to constantly press the second lens 35 against the lens-contacting portion 31b of the lens holder 31, the second lens 35 is highly precisely positioned without becoming unstable with respect to the lens holder 31. In addition, even if a large impact is accidentally applied to the second lens 35, the lens presser portions 36c absorb the impact by being elastically deformed, so that the second lens 35 can be prevented from cracking.

The above-described third embodiment has the following advantages in addition to the advantages of the first embodiment. Since the second lens presser frame 36 is configured such that the center of its outer circumference portion slightly deviates from the center of its inner circumference portion, the optical axis Z of the second lens 35 can be adjusted to a desired position, i.e., to the optical axis Z of the first lens 32, by rotating the second lens presser frame 36 along the wall portion 31c of the lens holder 31.

While, in the above-described first to third embodiments, laser beams are simultaneously radiated onto a plurality of sections, the exactly simultaneous laser radiation is not required. Laser beams may be radiated with such a time difference as to have no influence on the positional accuracy of a lens, for example, with a time difference of several tens of milliseconds to several hundred milliseconds. Furthermore, an object to be fixed is not limited to a lens, but may include a transparent glass or plastic plate, an optical member such as an optical filter, and the like.

Moreover, the first lens 22 or 32 described in the second or third embodiment is not essential for the present invention. An apparatus having another reference optical system (not shown) may be used to adjust the optical axis Z of the second lens 25 or 35.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-163921 filed Jun. 2, 2004, which is hereby incorporated by reference herein.

What is claimed is:

1. A fixation method for fixing a lens to a holding member by irradiating a laser beam, comprising the steps of:
   inserting the lens into the holding member made of a laser beam absorbent material;
   mounting a fixing member to the holding member in which the lens is inserted, the fixing member being made of a laser beam transparent material, the fixing member including a first portion and a second portion, the first portion directly contacting with the holding member and the second portion directly contacting with the lens; and
   irradiating laser beams only on the first portion of the fixing member and welding only an area where the fixing member and the holding member are contacting.

2. A fixation method according to claim 1, wherein the mounting step includes providing the holding member with a guide portion configured to guide the fixing member, and the fixing member with a recess portion configured to engage with the guide portion.

3. A fixation method according to claim 1, wherein the providing step includes configuring the fixing member such that a center of an outer circumference portion thereof deviates from a center of an inner circumference portion thereof.

4. A fixation method according to claim 1, wherein the providing step includes providing the fixing member with an impact absorbing portion configured to absorb an impact to the optical member fixed to the holding member.

5. An optical unit comprising:
   a lens;
   a holding member configured to hold the lens, the holding member including a wall portion configured to face an outer circumference portion of the lens, the holding member being made of a laser beam absorbent material; and
   a fixing member including a first portion directly contacting with an end of the wall portion of the holding member and a second portion directly contacting with the outer circumference portion of the lens, the fixing member being made of a laser beam transparent material, the fixing member being mounted to the holding member in which the lens is inserted such that the first portion directly contacts with the holding member and the second portion directly contacts with the lens,
   wherein only an area where the fixing member and the holding member are contacting is being welded by irradiating a laser beam only on the first portion of the fixing member.

6. An optical unit according to claim 5, wherein when the fixing member is mounted on the holding member, the holding member includes a guide portion configured to guide the fixing member, and the fixing member includes a recess portion configured to engage with the guide portion.

7. An optical unit according to claim 5, wherein the fixing member is configured such that a center of an outer circumference portion thereof deviates from a center of an inner circumference portion thereof.

8. An optical unit according to claim 5, wherein the fixing member includes an impact absorbing portion configured to absorb an impact to the optical member held by the holding member.

* * * * *